US010808943B2

(12) United States Patent
Armstrong et al.

(10) Patent No.: US 10,808,943 B2
(45) Date of Patent: *Oct. 20, 2020

(54) COOKING ENGAGEMENT SYSTEM WITH CAPACITIVE SENSING OF IMAGE SCREEN CONTAMINATION

(71) Applicant: Haier US Appliance Solutions, Inc., Wilmington, DE (US)

(72) Inventors: James Lee Armstrong, Louisville, KY (US); Michael A. Funk, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 215 days.

This patent is subject to a terminal disclaimer.

(21) Appl. No.: 16/104,999

(22) Filed: Aug. 20, 2018

(65) Prior Publication Data
US 2020/0056790 A1 Feb. 20, 2020

(51) Int. Cl.
F24C 15/00 (2006.01)
F24C 15/20 (2006.01)
A47J 36/38 (2006.01)

(52) U.S. Cl.
CPC ............ *F24C 15/006* (2013.01); *A47J 36/38* (2013.01); *F24C 15/2021* (2013.01); *F24C 15/2028* (2013.01)

(58) Field of Classification Search
CPC ...... F24C 15/2028; F24C 15/006; A47J 36/38
See application file for complete search history.

(56) References Cited

U.S. PATENT DOCUMENTS

| 4,475,534 | A | * | 10/1984 | Moriarty | F24C 15/2028 126/299 D |
|---|---|---|---|---|---|
| 8,997,732 | B2 | * | 4/2015 | Oagley | F24C 15/2064 126/213 |
| 9,447,977 | B2 | * | 9/2016 | Gillespie | F24C 7/08 |
| 2008/0102743 | A1 | | 5/2008 | Williams | |
| 2012/0152227 | A1 | * | 6/2012 | Oagley | F24C 15/2064 126/299 D |
| 2019/0154267 | A1 | * | 5/2019 | Garces | F24C 7/08 |
| 2020/0041346 | A1 | * | 2/2020 | Funk | H05B 6/6423 |

FOREIGN PATENT DOCUMENTS

| CN | 2513031 Y | 9/2002 |
|---|---|---|
| CN | 203052784 U | 7/2013 |
| CN | 205860179 U | 1/2017 |

* cited by examiner

Primary Examiner — Edelmira Bosques
Assistant Examiner — Nikhil P Mashruwala
(74) Attorney, Agent, or Firm — Dority & Manning, P.A.

(57) ABSTRACT

A cooking engagement system includes a cooktop appliance and an interactive assembly positioned above the cooktop appliance. The interactive assembly includes an image monitor that presents various images and information to a user, e.g., recipes, and a capacitive touch sensor that senses touches on an imaging surface of the image monitor. When the capacitive touch sensor senses a capacitance level below a threshold indicative of contamination on the imaging surface, a controller communicatively coupled thereto activates an air handler to move or motivate an airflow across or about the image monitor. In this way, the image monitor may be cooled and condensation is prevented from forming on the imaging surface of the image monitor.

6 Claims, 8 Drawing Sheets

COOKING ENGAGEMENT SYSTEM WITH CAPACITIVE SENSING OF IMAGE SCREEN CONTAMINATION

FIELD OF THE INVENTION

The present subject matter relates generally to systems for aiding cooking operations, and more particularly to systems for enhancing cooking engagement and convenience with a cooktop appliance.

BACKGROUND OF THE INVENTION

Cooktop or range appliances generally include heating elements for heating cooking utensils, such as pots, pans, and griddles. A variety of configurations can be used for the heating elements located on the cooking surface of the cooktop. The number of heating elements or positions available for heating on the range appliance can include, for example, four, six, or more depending upon the intended application and preferences of the buyer. These heating elements can vary in size, location, and capability across the appliance.

Unfortunately, existing systems can provide an unsatisfactory user experience and can inhibit a user's desired interactions. Recipe books are often cumbersome and difficult to use while cooking. Pages may rip, stain, burn, or become otherwise damaged during use. Moreover, printed materials do not allow for immediate real-time guidance or information. Electronic devices that are connected to the Internet, such as a computer, tablet, or smartphone, may allow for immediate interaction with remote information servers or individuals. However, such devices are generally not suitable for use in tandem with a cooktop appliance. A user may be forced to repeatedly move away from the cooktop appliance in order to view the device or provide any input instructions. Moreover, the extreme environment near a cooktop appliance may risk damaging the device. For instance, a display of the device may be rendered unusable. In particular, food or steam may obscure the display. In some cases, heat or exhaust fumes may flow across the display screen, causing condensation to form thereon and increasing the potential for display failure.

As a result, improved systems are needed for facilitating user engagement and interaction during use of a cooktop appliance. In particular, it may be advantageous to provide a user engagement system to permit the viewing or accessing images and information while using a cooktop appliance. In some cases, it may be advantageous to further provide a user engagement system configured to protect one or more electronic components from the extreme environment near or above a cooktop appliance.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of operating a cooking system is provided. The cooking system includes an interactive assembly and a cooktop appliance defining a vertical direction. The method includes receiving a signal from a capacitive touch sensor of the interactive assembly. The signal is indicative of a presence of contamination on an imaging surface of an image monitor of the interactive assembly. The interactive assembly positioned above the cooktop appliance along the vertical direction. The method also includes activating an air handler disposed within a casing of the interactive assembly based on the signal received from the capacitive touch sensor. As a result of activating the air handler, air is moved across or about the image monitor.

In another exemplary aspect of the present disclosure, a method of operating a cooking system is provided. The cooking system includes an interactive assembly and a cooktop appliance defining a vertical direction. The method includes measuring a mutual capacitance with a capacitive touch sensor of the interactive assembly and comparing the measured mutual capacitance to a touch threshold. The method also includes activating an air handler disposed within a casing of the interactive assembly when the measured mutual capacitance is less than the touch threshold. As a result of activating the air handler, air is moved across or about an image monitor of the interactive assembly.

In still another exemplary aspect of the present disclosure, a cooking system is provided. The cooking system defines a vertical direction, a lateral direction, and a transverse direction. The cooking system includes a cooktop appliance comprising a cooktop surface and one or more heating elements positioned at the cooktop surface, as well as a casing positioned above the cooktop appliance along the vertical direction. An image monitor is supported by the casing. The image monitor includes an imaging surface and a capacitive touch sensor configured to detect a touch on the imaging surface. An air handler is mounted within the casing. A controller is communicatively coupled with the air handler and the capacitive touch sensor. The controller is configured to receive a signal from the capacitive touch sensor. The signal is indicative of a presence of contamination on the imaging surface. The controller is further configured to activate the air handler based on the signal received from the capacitive touch sensor. As a result of activating the air handler, air is moved across or about the image monitor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
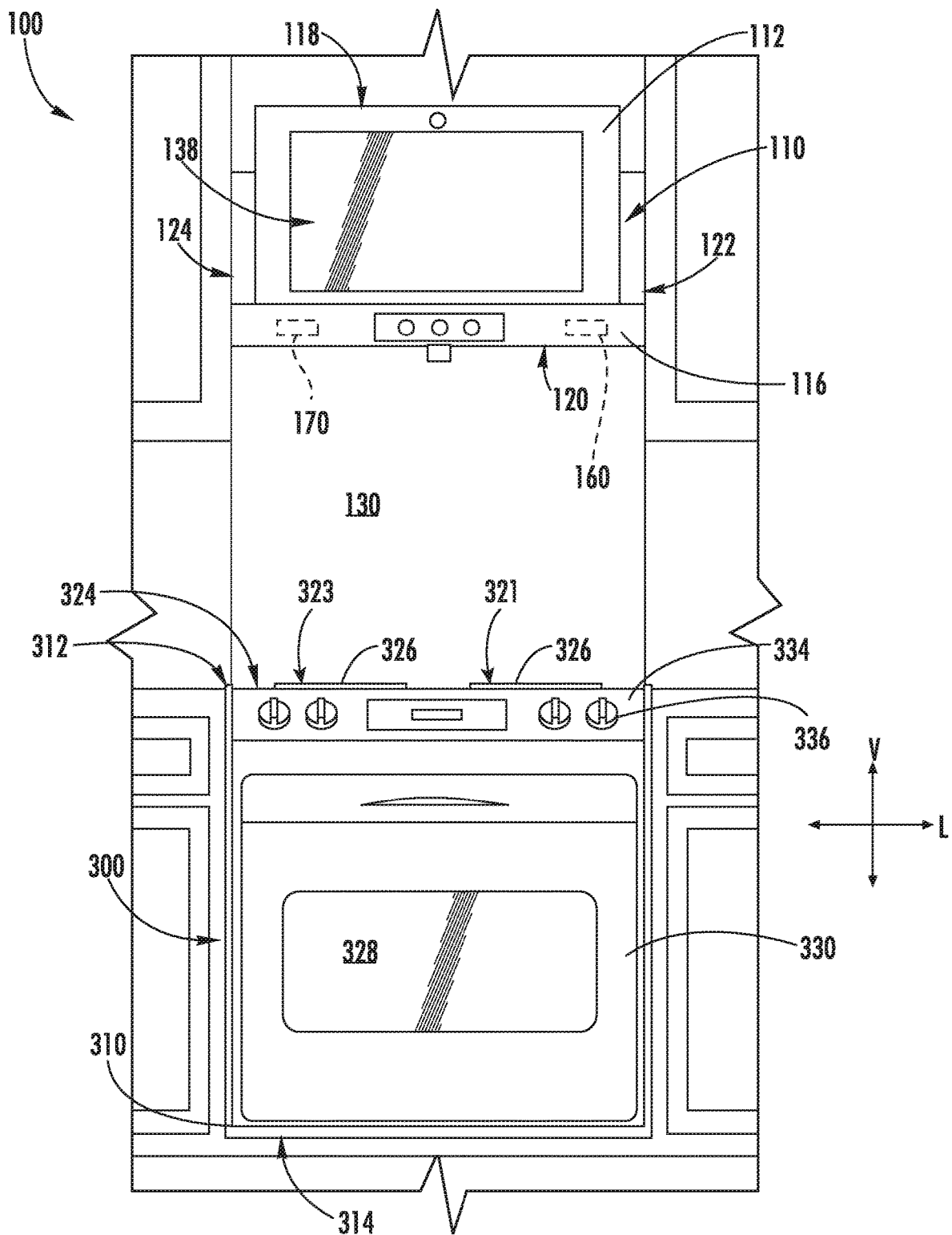
FIG. 1 provides a front perspective view of a system according to exemplary embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present disclosure. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. As used herein, terms of approximation such as "generally," "about," or "approximately" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Figure 2:
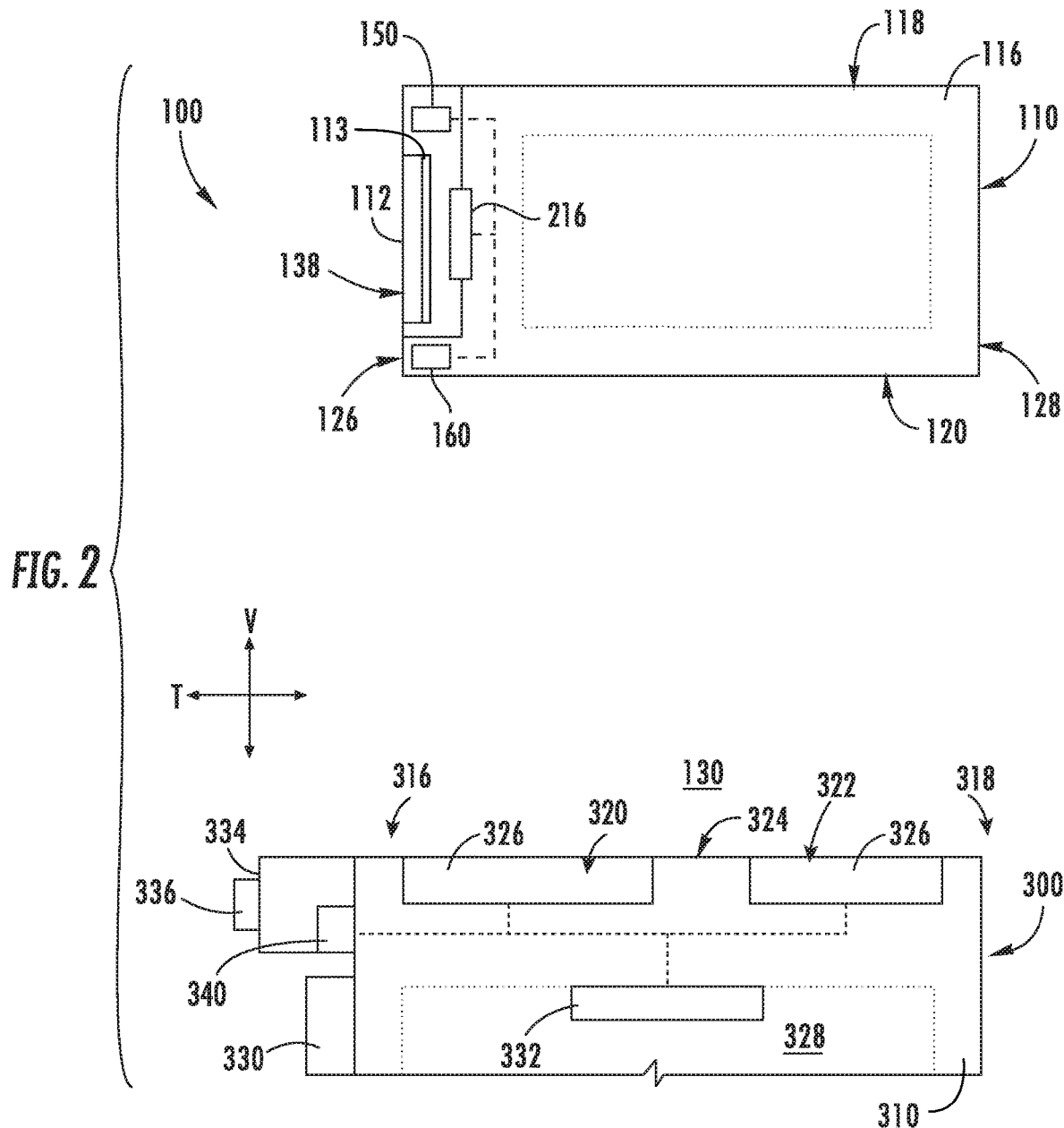
FIG. 2 provides a side schematic view of the exemplary system of FIG. 1.

FIGS. 1 and 2 provide various views of a system 100 according to exemplary embodiments of the present disclosure. Generally, system 100 includes a cooktop appliance 300 and an interactive assembly 110 positioned above cooktop appliance 300 as shown in FIGS. 1 and 2. Features of cooktop appliance 300 and interactive assembly 110 are described below.

As shown in FIGS. 1 and 2, cooktop appliance 300 defines a vertical direction V, a lateral direction L (FIG. 1), and a transverse direction T (FIG. 2). The vertical, lateral, and transverse directions V, L, T are mutually perpendicular and form an orthogonal direction system. For this embodiment, cooktop appliance 300 extends between a top portion 312 and a bottom portion 314 (FIG. 1), e.g., along the vertical direction V; between a left side portion and a right side portion, e.g., along the lateral direction L; and between a front portion 316 and a rear portion 318 (FIG. 2), e.g., along the traverse direction T.

Cooktop appliance 300 includes a chassis or cabinet 310 and a cooktop surface 324 having one or more heating elements 326 for use in, for example, heating or cooking operations. In some embodiments, cooktop surface 324 is constructed with ceramic glass. In other embodiments, however, cooktop surface 324 may be formed of another suitable material, such as a metallic material (e.g., steel) or another suitable non-metallic material. Heating elements 326 may be various sizes and may employ any suitable method for heating or cooking an object, such as a cooking utensil (not shown), and its contents. In some embodiments, for example, heating element 326 uses a heat transfer method, such as electric coils or gas burners, to heat the cooking utensil. In other embodiments, however, heating element 326 uses an induction heating method to heat the cooking utensil directly. Accordingly, heating element 326 may include a gas burner element, resistive heat element, radiant heat element, induction element, or another suitable heating element. As shown particularly in FIG. 2, for this embodiment, the cooktop appliance 300 includes at least one forward heating element 320 and at least one rear heating element 322.

In addition, as further shown in FIGS. 1 and 2, cabinet 310 is insulated and defines a cooking chamber 328 selectively covered by a door 330. One or more chamber heating elements 332 (e.g., top broiling elements or bottom baking elements) may be enclosed within cabinet 310 to heat cooking chamber 328. Chamber heating elements 332 within cooking chamber 328 may be provided as any suitable element for cooking the contents of cooking chamber 328, such as an electric resistive heating element, a gas burner, a microwave element, a halogen element, etc. Thus, cooktop appliance 300 may be referred to as an oven range appliance. As will be understood by those skilled in the art, cooktop appliance 300 is provided by way of example only, and the present subject matter may be used in the context of any suitable cooktop appliance, such as a standalone cooktop fitted integrally with a surface of a kitchen counter. Thus, the example embodiments illustrated in the figures are not intended to limit the present subject matter to any particular cooking chamber or heating element configuration, except as otherwise indicated.

As illustrated, cooktop appliance 300 includes a user interface panel 334, e.g., positioned at the front portion 316 of the cooktop appliance 300. Although shown at front portion 316 of cooktop appliance 300, another suitable locations or structures (e.g., a backsplash) for supporting user interface panel 334 may be provided in alternative embodiments. For this embodiment, user interface panel 334 includes input components or controls 336, such as one or more of a variety of electrical, mechanical, or electromechanical input devices. Controls 336 may include, for example, rotary dials, knobs, push buttons, and touch pads. A controller 340 (FIG. 2) is communicatively coupled with user interface panel 334 and controls 336, e.g., by a suitable wired or wireless connection, for controlling cooktop appliance. Thus, a user may select various operational features and modes via controls 336 and monitor progress of cooktop appliance 300. In additional or alternative embodiments, user interface panel 334 includes a display component, such as a digital or analog display, communicatively coupled with controller 340. The display component is configured to provide operational feedback to a user. In certain embodiments, user interface panel 334 represents a general purpose I/O ("GPIO") device or functional block.

As noted above, controller 340 is communicatively coupled (i.e., in operative communication) with user interface panel 334 and controls 336. Controller 340 may also be communicatively coupled with various operational components of cooktop appliance 300 as well, such as heating elements (e.g., 326, 332), sensors, etc. Input/output ("I/O") signals may be routed between controller 340 and the various operational components of cooktop appliance 300. Thus, controller 340 can selectively activate and operate these various components. Various components of cooktop appliance 300 are communicatively coupled with controller 340 via one or more communication lines such as, for example, conductive signal lines, shared communication busses, or wireless communications bands.

In some embodiments, controller 340 includes one or more memory devices and one or more processors. The processors can be any combination of general or special purpose processors, CPUs, or the like that can execute programming instructions or control code associated with operation of cooktop appliance 300. The memory devices (i.e., memory) may represent random access memory such as DRAM or read only memory such as ROM or FLASH. In one embodiment, the processor executes programming instructions stored in memory. The memory may be a separate component from the processor or may be included onboard within the processor. Alternatively, controller 340 may be constructed without using a processor, for example, using a combination of discrete analog or digital logic circuitry (such as switches, amplifiers, integrators, comparators, flip-flops, AND gates, and the like) to perform control functionality instead of relying upon software.

In certain embodiments, controller 340 includes a network interface such that controller 340 can connect to and communicate over one or more networks with one or more network nodes. Controller 340 can also include one or more transmitting, receiving, or transceiving components for transmitting/receiving communications with other devices communicatively coupled with cooktop appliance 300. Additionally or alternatively, one or more transmitting, receiving, or transceiving components can be located off board controller 340. Generally, controller 340 can be positioned in any suitable location throughout cooktop appliance 300. For example, controller 340 may be located proximate user interface panel 334 toward front portion 316 of cooktop appliance 300.

As shown further in FIGS. 1 and 2, interactive assembly 110 includes one or more casings positioned above cooktop appliance 300 along the vertical direction V. For this embodiment, interactive assembly 110 includes a casing 116 positioned above cooktop appliance 300. Casing 116 includes a plurality of outer walls and generally extends between a top end 118 and a bottom end 120, e.g., along the vertical direction V; between a first side end 122 and a second side end 124 (FIG. 1), e.g., along the lateral direction L; and between a front end 126 and a rear end 128 (FIG. 2), e.g., along the transverse direction T. In some embodiments, casing 116 is spaced from cooktop surface 324 along the vertical direction V. An open region 130 may thus be defined along the vertical direction V between cooktop surface 324 and bottom end 120 of casing 116. In some embodiments, the interactive assembly 110 may include one or more humidity sensors 160 and 170 configured to detect or sense a humidity level of the air proximate humidity sensor(s) 160 and/or 170. However, as described below, the interactive assembly 110 may include a touchscreen configured to detect moisture or other contamination, and in such embodiments, the humidity sensors 160 and 170 may be omitted.

In some embodiments, casing 116 is formed as a range hood. As will be described in detail below, a ventilation assembly 140 (shown in FIGS. 5 and 6) within casing 116 may move an airflow from the open region 130 through casing 116. However, a range hood is provided by way of example only. Other configurations may be used within the spirit and scope of the present disclosure. For example, casing 116 could be part of a microwave or other appliance designed to be located above cooktop surface 324. Moreover, although a generally rectangular shape is illustrated, any suitable shape or style may be adapted to form the structure of casing 116.

As further depicted in FIGS. 1 and 2, the interactive assembly 110 includes a controller 150 (FIG. 2) and an image monitor 112 communicatively coupled thereto. The image monitor 112 is mounted to and supported by casing 116. Image monitor 112 is provided above cooktop surface 324, e.g., along the vertical direction V. More particularly, for this embodiment, image monitor 112 is mounted to and supported on casing 116 (e.g., directly above cooktop surface 324) proximate to the front end 126 of casing 116. Generally, image monitor 112 may be any suitable type of mechanism for visually presenting an image (e.g., a digital image). For example, image monitor 112 may be a liquid crystal display (LCD), a plasma display panel (PDP), a cathode ray tube (CRT) display, etc. Image monitor 112 includes an imaging surface 138 (e.g., screen or display panel) at which the image is presented or displayed as an optically-viewable picture (e.g., static image or dynamic video) to a user. Optionally, a protective transparent panel (e.g., formed from a transparent glass, plastic, etc.) may be positioned across or over imaging surface 138. In such embodiments, the protective transparent panel is mounted within or supported on casing 116 forward of imaging surface 138 along the transverse direction T. The image monitor 112 includes a capacitive touch sensor 113 configured to detect touches on the imaging surface 138 and thereby provide touchscreen capability. In this way, a user may touch various digitally presented images to control various features, such as e.g., the images displayed by image monitor 112, appliances communicatively coupled with controller 150, and other features, such as e.g., a camera, a microphone, etc.

It should be noted that the controller 150 as disclosed herein is capable of and may be operable to perform any methods and associated method steps as disclosed herein. For example, in some embodiments, some or all of the method steps described herein may be provided as programming instructions stored in memory devices and executed by processors, such as the memory devices and processors described above.

The optically-viewable image at the imaging surface 138 of image monitor 112 may correspond to any suitable signal or data received or stored by interactive assembly 110 (e.g., at controller 150). As an example, image monitor 112 may present recipe information in the form of viewable text or images. As another example, image monitor 112 may present a remotely captured image, such as a live (e.g., real-time) dynamic video stream received from a separate user or device. As yet another example, image monitor 112 may present a graphical user interface (GUI) that allows a user to select or manipulate various operational features of interactive assembly 110, cooktop appliance 300, or other components communicatively coupled with controller 150, e.g., via image monitor's touchscreen capabilities described above. During use, a user may engage, select, or adjust the image presented at image monitor 112 through touch input, where touches on the imaging surface 138 may be detected by the capacitive touch sensor 113.

As illustrated best in FIG. 2, for this embodiment, the imaging surface 138 is oriented orthogonal to cooktop surface 324 and generally faces, or is directed away from, cooktop surface 324. In particular, imaging surface 138 is directed toward an area forward of cooktop appliance 300. During use, a user standing in front of cooktop appliance 300 may view the optically-viewable images (e.g., recipe, dynamic video stream, graphical user interface, etc.) displayed at imaging surface 138. Optionally, the imaging surface 138 may be positioned at an oblique angle with respect to the vertical direction V.

Figure 3:
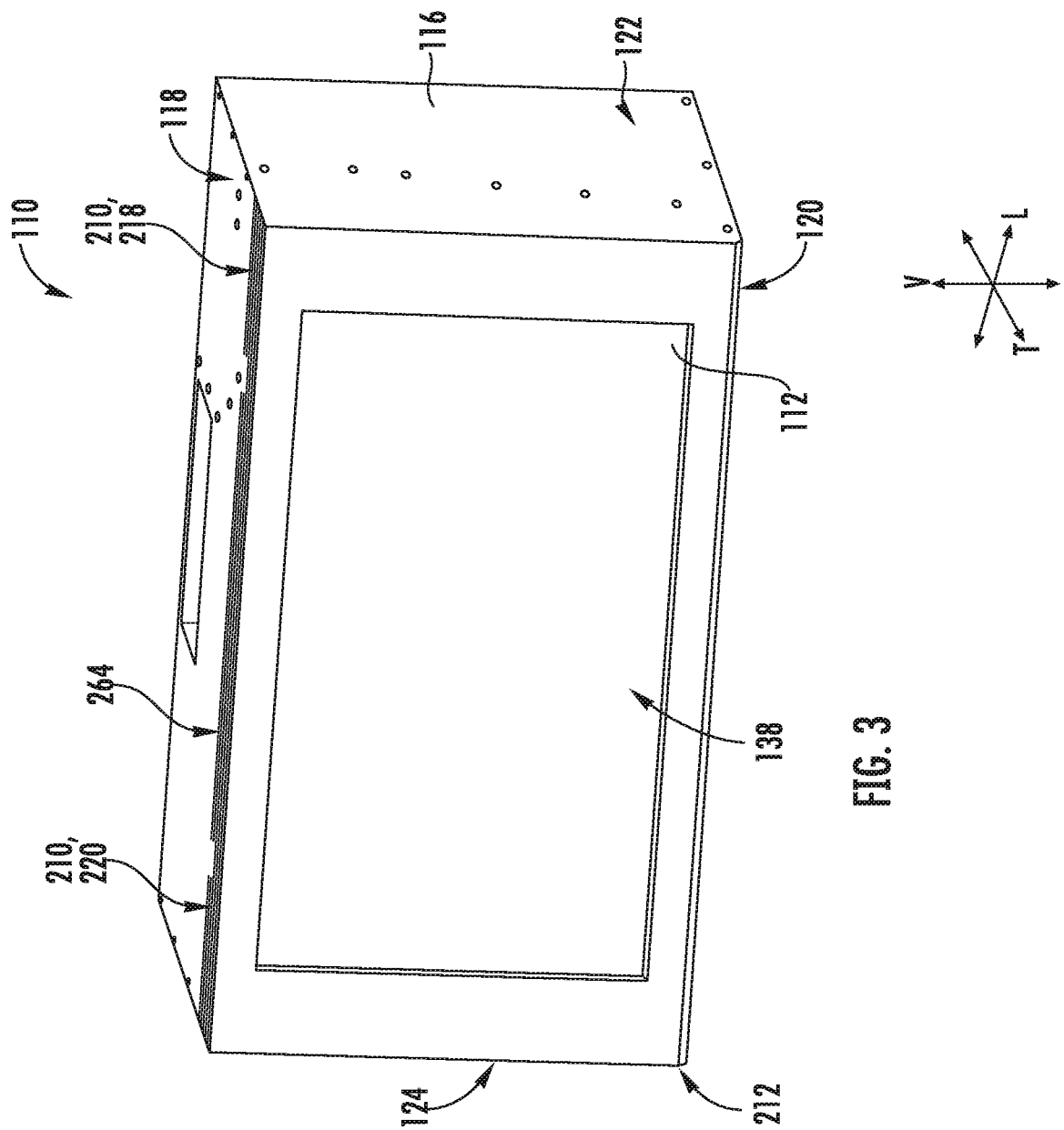
FIG. 3 provides a perspective view of an interactive assembly of a system according to exemplary embodiments of the present disclosure.
Figure 4:
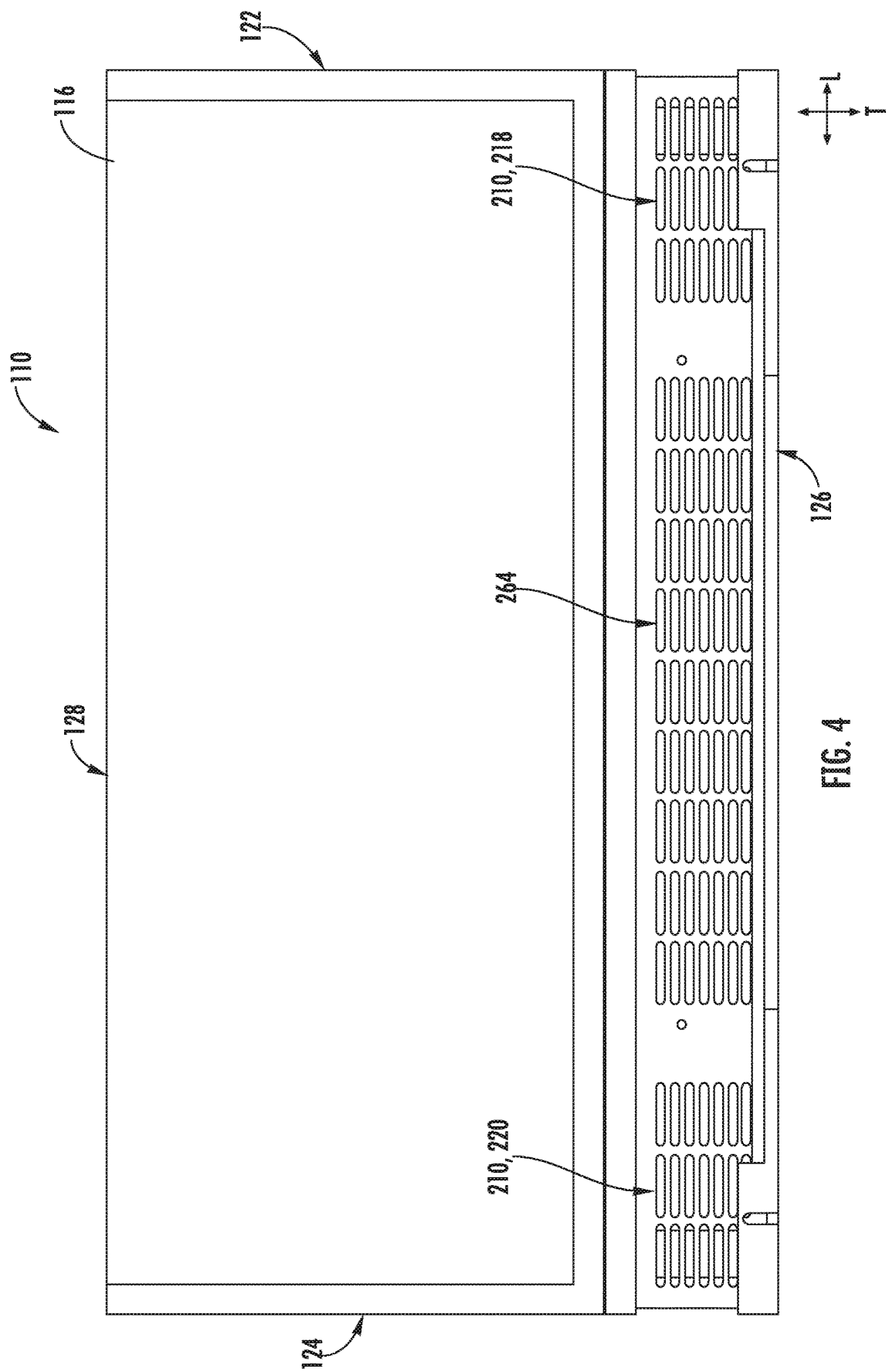
FIG. 4 provides a top perspective view of the exemplary interactive assembly of FIG. 3.
Figure 5:
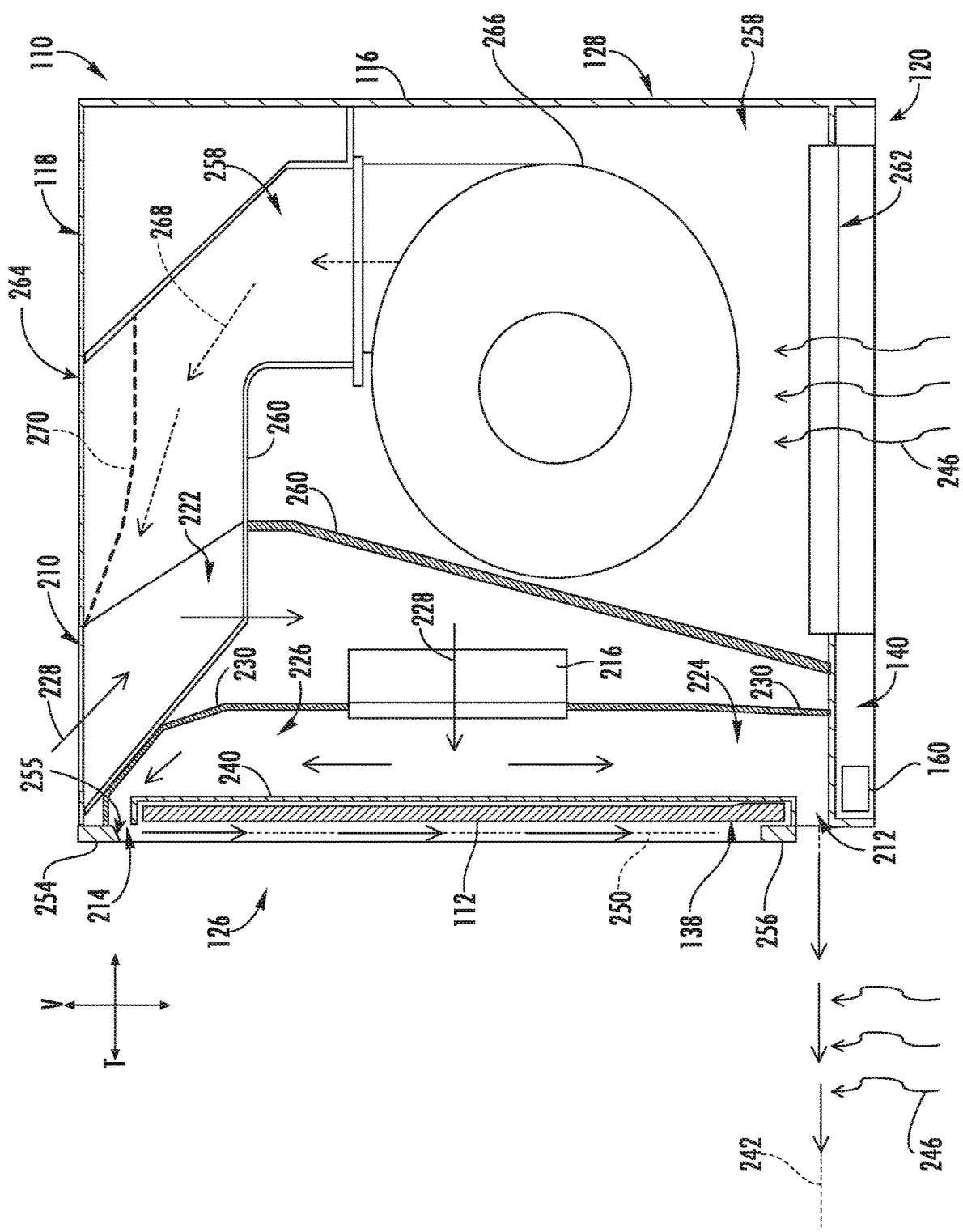
FIG. 5 provides a cross-sectional schematic view of an interactive assembly of a system according to exemplary embodiments of the present disclosure.

FIGS. 3, 4, and 5 provide various views of interactive assembly 110 according to exemplary embodiments of the present disclosure. As noted previously, casing 116 extends between top end 118 and bottom end 120 (FIGS. 3 and 5), e.g., along the vertical direction V, between front end 126 and rear end 128 (FIGS. 4 and 5), e.g., along the transverse direction T, and between first side end 122 and second side end 124 (FIGS. 3 and 4), e.g., along the lateral direction L. One or more air inlets 210 and air outlets 212, 214 are defined by casing 116 (e.g., through one or more external walls of casing 116). Moreover, as shown best in FIG. 5, one or more air handlers 216 (e.g., fans or blowers) are mounted within casing 116 to move or motivate an airflow through one or more passages or cavities defined within casing 116 between the air inlet 210 and the air outlets 212, 214. For this embodiment, air handler 216 is mounted within casing 116 downstream of at least one air inlet 210 and upstream of at least one air outlet 212, 214.

In some embodiments, air inlet 210 is defined at a position proximate to the top end 118 (e.g., above image monitor 112 relative to the vertical direction V), while one or more of air outlets 212, 214 are defined at a position (e.g., discrete positions) proximate to the front end 126. Additionally or alternatively, the air inlet 210 may be defined through the casing 116 behind the image monitor 112 relative to the transverse direction T. As shown, for instance in FIG. 4, air inlet 210 may include a plurality of inlet apertures defined through a top wall of casing 116. In some embodiments, the inlet apertures include a first aperture set 218 that is spaced apart from a second aperture set 220, e.g., along the lateral direction L. First aperture set 218 may be proximate to first side end 122 and second aperture set 220 may be proximate to second side end 124. Thus, air may be drawn into casing 116 from both first side end 122 and second side end 124.

One or more air passages are defined by casing 116 and provide fluid communication between air inlet 210 and air outlets 212, 214. For the depicted embodiment of FIG. 5, an air intake passage 222 is defined within casing 116. Particularly, air intake passage 222 is defined at a location proximate the front end 126. In some embodiments, air intake passage 222 may provide a common cavity open to both first aperture set 218 and second aperture set 220. Further, for this embodiment, air intake passage 222 extends generally along the vertical direction V and rearward along the transverse direction T (e.g., behind or rearward of image monitor 112). One or more outlet passages 224, 226 are defined downstream of air intake passage 222. For instance, a lower outlet passage 224 extends downward along the vertical direction V to first air outlet 212 (e.g., defined proximate bottom end 120), while an upper outlet passage 226 extends upward along the vertical direction V to second air outlet 214 (e.g., defined proximate top end 118).

As shown best in FIG. 5, in some exemplary embodiments, air handler 216 is a common or shared air handler. For this embodiment, air handler 216 is fluidly connected with and positioned between air intake passage 222 and air outlet passages 224, 226. Common air handler 216 may be provided as any suitable blower or fan (e.g., radial fan, tangential fan, etc.) positioned within casing 116 to actively move or motivate air therethrough. Common air handler 216 is positioned upstream of both the first air outlet 212 and the second air outlet 214 and downstream of air inlet 210. As an example, common air handler 216 may be mounted to or on an internal duct wall 230 separating air intake passage 222 from air outlet passages 224, 226. Common air handler 216 may thus motivate an airflow (e.g., as indicated arrows 228) from air inlet 210 to first air outlet 212 and second air outlet 214 simultaneously.

Figure 6:
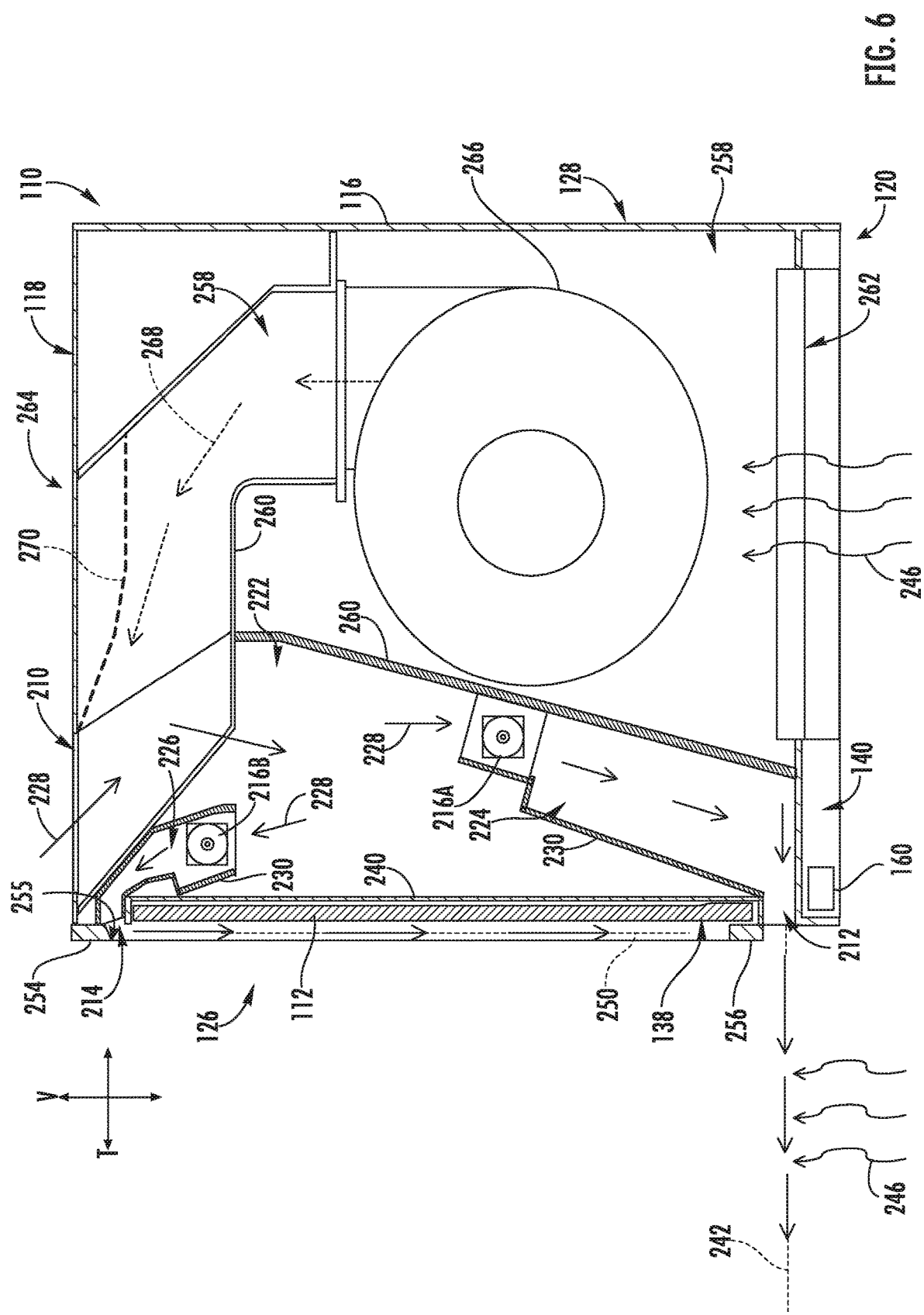
FIG. 6 provides a cross-sectional schematic view of an exemplary interactive assembly of a system according to another exemplary embodiment of the present disclosure.

FIG. 6 provides a cross-sectional schematic view of another exemplary interactive assembly 110 for system 100 in accordance with exemplary embodiments of the present disclosure. As shown in FIG. 6, in some embodiments, interactive assembly 110 includes multiple discrete air handlers 216A, 216B that correspond to different air outlets 212, 214. For instance, a first air handler 216A may be provided upstream of first air outlet 212, while second air handler 216B is provided upstream of second air outlet 214. As shown, in such embodiments, upper outlet passage 226 and lower outlet passage 224 are defined, at least in part, by separate duct walls 230. For this embodiment, upper outlet passage 226 and lower outlet passage 224 are spaced apart along the vertical direction V. First air handler 216A is mounted on or within lower outlet passage 224, while second air handler 216B is mounted on or within upper outlet passage 226. As will be appreciated, first and second air handlers 216A, 216B may each be provided as any suitable blower or fan (e.g., radial fan, tangential fan, etc.) positioned within casing 116 to actively move or motivate air therethrough.

As shown in FIGS. 5 and 6, in some embodiments, an internal wall 240 is positioned between image monitor 112 and one or both of the intake passage 222 or the air outlet passages 224, 226 along the transverse direction T (e.g., such that internal wall 240 separates image monitor 112 and intake passage 222 or outlet passages 224, 226). Advantageously, the airflow across internal wall 240 may convectively cool the electronic components within casing 116 (e.g., image monitor 112 and capacitive touch sensor 113 (FIG. 2)). Moreover, cooling may occur without passing the airflow directly across such electronic components.

In certain embodiments, one air outlet (e.g., curtain air outlet or first air outlet 212) is provided below image monitor 112 along the vertical direction V. In particular, first air outlet 212 is defined by casing 116 at the front end 126 and directly below image monitor 112, e.g., along the vertical direction V. Thus, at least a portion of the airflow motivated by air handler 216 (FIG. 5) or air handler 216A (FIG. 6) may be directed from air inlet 210 to the ambient environment in front of casing 116 and image monitor 112 through first air outlet 212.

In some embodiments, as shown in both FIGS. 5 and 6, an airflow curtain path 242 is generally defined substantially orthogonal to the vertical direction V by first air outlet 212. In particular, airflow curtain path 242 may extend outward (e.g., in the transverse direction T) from casing 116 in front of image monitor 112. Airflow curtain path 242 may also extend along the lateral direction L as well. In such embodiments, when air handler 216 is activated by controller 150, air handler 216 moves air through air outlet 214 and along airflow curtain path 242. Thus, air moved through first air outlet 212, e.g., by air handler 216 or 216A, is projected from casing 116 along airflow curtain path 242, forming a curtain or blade of fast-moving air in front of casing 116

(i.e., forward of casing 116 along a direction orthogonal to the vertical direction V). In certain embodiments, airflow curtain path 242 is defined to have an airflow angle between 0° and 90° with respect to (i.e., relative to) one or both of the vertical direction V or the image surface 138 (e.g., in a direction generally parallel to or away from cooktop appliance 300 (FIG. 1)). Thus, airflow curtain path 242 (and its associated curtain of air) extends from casing 116 or imagine monitor 112 along the airflow angle. In some embodiments, the air flow curtain path 242 may be generally orthogonal to the vertical direction V, e.g., within ten degrees (10°) of a direction orthogonal to the vertical direction V.

During use of cooktop appliance 300, cooking byproducts such as heat, steam, and/or exhaust fumes (e.g., as represented by arrows 246 in FIGS. 5 and 6) which may be generated at cooktop appliance 300 (or another location directly beneath first air outlet 212) may be advantageously blocked or restricted by the mass of air flowing along airflow curtain path 242. In turn, the visibility at imaging surface 138 may be preserved, while further protecting various electronic components (e.g., image monitor 112 or controller 150 (FIG. 2)) mounted within casing 116 from damage that may be caused by heat, steam, or exhaust fumes 246. Optionally, image monitor 112 may be positioned such that imaging surface 138 extends away from airflow curtain path 242 (e.g., along a non-orthogonal angle relative to the vertical direction V).

With reference still to FIGS. 5 and 6, in certain embodiments, another air outlet (e.g., an upper or second air outlet 214) is defined by casing 116. For instance, second air outlet 214 may be defined through casing 116 at the top end 118. In particular, second air outlet 214 may be directed downward at the front end 126 of casing 116 forward of imaging surface 138. Along with being positioned forward of imaging surface 138, e.g., along the transverse direction T, second air outlet 214 may be positioned above the image monitor 112 and the imaging surface 138 thereof, e.g., along the vertical direction V. As illustrated, second air outlet 214 defines a cooling airflow path 250 along imaging surface 138. Further, in such embodiments, when air handler 216 is activated, air handler 216 moves air through air outlet 214 and along cooling airflow path 250. Cooling airflow path 250 may extend from a position above the imaging surface 138 and may extend along at least a portion of the vertical length of the imaging surface 138. In some embodiments, the cooling airflow path 250 extends substantially all of the vertical length of the imaging surface 138. Thus, at least a portion of the airflow motivated by air handler 216 (FIG. 5) or air handler 216B (FIG. 6) may be directed from intake passage 222 to the ambient environment as it flows along imaging surface 138. Optionally, cooling airflow path 250 may be defined parallel to imaging surface 138, or otherwise at a nonparallel angle relative to the airflow angle of the airflow curtain path 242. Advantageously, the cooling airflow path 250 may draw heat from image monitor 112 to further prevent gas, fumes, or moisture from accumulating on imaging surface 138.

Notably, as shown in FIGS. 5 and 6, a lateral front plate 254 of casing 116 includes a beveled surface 255 that at least partially defines air outlet 214 and is configured to direct or motivate air along cooling airflow path 250. By moving air along cooling airflow path 250, heat, steam, and/or exhaust fumes (represented by arrows 246 in FIGS. 5 and 6) generated at cooktop appliance 300 may be advantageously moved away from the imaging surface 138 by the mass of air flowing along cooling airflow path 250 thus preventing condensation from forming on imaging surface 138. Moreover, the visibility at imaging surface 138 may be preserved, while further protecting various electronic components (e.g., imagine monitor 112 or controller 150 (FIG. 2)) mounted to or within casing 116.

In some embodiments, casing 116 includes both second air outlet 214 defined above image monitor 112 along the vertical direction V and first air outlet 212 defined below image monitor 112 along the vertical direction V. In such embodiments, when controller 150 activates air handler 216, air handler 216 moves or motivates air through second air outlet 214 along cooling airflow path 250 and through first air outlet 212 along airflow curtain path 242. In such embodiments, the advantages described above with respect motivating air along airflow curtain path 242 and cooling airflow path 250 are both applicable. Particularly, motivating air along the paths 242, 250 in combination may provide extra protection for image monitor 112 and components of interactive assembly 110. In some embodiments, a single air handler 216 may be activated to move or motivate air through first air outlet 212 and second air outlet 214, e.g., as shown in FIG. 5. In other embodiments, multiple air handlers 216A, 218B, may be activated to move or motivate air through first air outlet 212 and second air outlet 214, respectively, e.g., as shown in FIG. 6.

As further shown in FIGS. 5 and 6, in certain embodiments, an exhaust passage 258 is defined within casing 116. As shown, exhaust passage 258 may extend in fluid isolation from air intake passage 222 and air outlet passages 224, 226. That is, exhaust passage 258 may not be fluidly connected or in communication with air intake passage 222 and air outlet passages 224, 226. One or more interior exhaust duct walls 260 separate the air passages 222, 224, 226 and exhaust passage 258. An exhaust inlet 262 and an exhaust outlet 264 are defined at opposing ends of exhaust passage 258. In some embodiments, exhaust inlet 262 is defined by casing 116 proximate the bottom end 120. In addition, exhaust outlet 264 is defined through casing 116 proximate top end 118 (e.g., through a top wall of casing 116). Optionally, exhaust outlet 264 may include a plurality of exhaust apertures. In some such embodiments, exhaust outlet 264 may be positioned between the first aperture set 218 and the second temperature set 220, e.g., along the lateral direction L as shown in FIG. 5. Each aperture of the first aperture set 218 and each aperture of the second aperture set 220 may be laterally spaced from exhaust outlet 264 (e.g., to restrict the flow of exhaust to the air inlet 210).

An exhaust air handler 266 may be mounted within exhaust passage 258 as shown in the depicted embodiments of FIGS. 5 and 6. As will be understood, exhaust air handler 266 may be provided as any suitable blower or fan (e.g., radial fan, tangential fan, etc.) positioned within casing 116 to actively move or motivate air, steam, or exhaust fumes through exhaust passage 258. During use of cooktop appliance 300 (FIG. 2), the heat, steam, or exhaust fumes 246 may be motivated by exhaust air handler 266 from open region 130 (FIG. 2) to exhaust passage 258 through exhaust inlet 262 and ultimately to exhaust outlet 264 (e.g., as indicated by arrows 268). Optionally, one or more filters (not pictured) may be provided at exhaust inlet 262 (e.g., between open region 130 and exhaust passage 258) to clean the air, steam, or exhaust fumes 246 as it enters casing 116. For instance, a grease filter having a suitable coarse filter medium, such as a metallic mesh including aluminum or stainless steel, may be mounted across exhaust inlet 262. Additionally or alternatively, an odor filter having a suitable fine filter medium, such as a mesh or block including activated carbon, may be mounted across exhaust inlet 262.

Optionally, the odor filter may be positioned above or downstream from the grease filter.

As illustrated, at least a portion of exhaust passage 258 may be tapered downstream from exhaust air handler 266. For instance, an angled top plate 270 may be positioned proximate to top end 118 within exhaust passage 258. Angled top plate 270 may extend, for instance downward, from exhaust outlet 264, thereby reducing the cross-sectional area of exhaust passage 258 and accelerating the flow rate of air or exhaust gases (e.g., at 268) upstream of exhaust outlet 264. As air or exhaust gases flow from exhaust outlet 264, the accelerated flow rate induced by angled top plate 270 may advantageously prevent exhaust gases from flowing to air inlet 210.

As mentioned above, the image monitor 112 of the interactive assembly 110 includes a capacitive touch sensor 113, as shown in FIG. 2. Generally, capacitive touch sensor 113 is configured to detect a change in capacitance, where the change in capacitance is due to the presence of, e.g., a user's finger or another object, such as moisture, grease, debris, etc. The capacitance may be measured using either self-capacitance or mutual capacitance, that is, the capacitive touch sensor 113 may be selectively operable in a self-capacitance mode or a mutual capacitance mode. Self-capacitance measures capacitance with reference to ground, whereas mutual capacitance measures capacitance between two electrodes. Thus, the presence of a grounded object, such as the finger or other body part of a user who is standing on the ground, will result in a much larger change in self-capacitance than the presence of a non-grounded object, e.g., contamination such as moisture or other particles that may accumulate or otherwise be deposited on the imaging surface 138. In at least some embodiments, the capacitive touch sensor may include a shield electrode to enhance the distinction in self-capacitance measurements between the presence of grounded objects and non-grounded objects. Accordingly, a change in mutual capacitance detected by the capacitive touch sensor 113 may indicate the presence of contamination on the imaging surface, in particular when the change in mutual capacitance is not accompanied by or associated with a change in self-capacitance of a similar magnitude.

An exemplary manner in which capacitive touch sensor 113, controller 150, and air handler 216 interact to ultimately flow air across or around image monitor 112 will be described below. As noted above, controller 150 is communicatively coupled with air handler 216 and capacitive touch sensor 113. In some embodiments, controller 150 is configured to receive, from capacitive touch sensor 113, one or more signals indicative of the presence of contamination on the imaging surface 138. Such signals may be routed to controller 150 by a suitable communication line, e.g., by a suitable wired or wireless connection. In some embodiments, the one or more signals generated by capacitive touch sensor 113 are received by controller 150 directly from capacitive touch sensor 113. In other embodiments, the one or more signals generated by capacitive touch sensor 113 are received by controller 150 indirectly from capacitive touch sensor 113. For instance, the signals may pass through or be routed through one or more electronic components, e.g., such as a signal filter or processor. Further, the signals generated by capacitive touch sensor 113 may be any suitable type of signal, e.g., analog or digital. Capacitive touch sensor 113 routes one or more signals to controller 150 regardless of whether cooktop appliance 300 is on or off, including when the interactive assembly 110 is in an active mode (e.g., turned "on") or is inactive, e.g., in a lower power or "sleep" mode or is off. Using the capacitive touch sensor 113 to detect moisture accumulation on the imaging surface 138 may be particularly advantageous when the interactive assembly 110 is inactive and the cooktop appliance 300 is on such that steam, vapors, and other cooking byproducts may be generated from the cooking appliance 300, where the interactive assembly 110 may otherwise not respond to accumulated contamination of the cooking byproducts on the imaging screen 138 when the interactive assembly 110 is inactive, e.g., in sleep mode or off.

Signals are routed from capacitive touch sensor 113 to controller 150. For example, in some embodiments, the signals may include digital data such as raw data counts, where the number of raw data counts from the capacitive touch sensor 113 corresponds to a magnitude of the measured capacitance. When a low or decreased mutual capacitance is detected, the corresponding signal may be indicative of the presence of contamination on the imaging surface 138. In such instances, output signals, e.g., a small raw data count associated with a mutual capacitance, particularly when accompanied by a negligible or relatively small raw data count associated with a self-capacitance, generated by capacitive touch sensor 113 may be used by controller 150 to automatically activate air handler 216 without external input from a user. In some embodiments, the capacitive touch sensor 113 may include at least some elements of a controller, e.g., one or more processors, onboard the capacitive touch sensor 113, such that at least some of the processing of the raw data count signal may be performed by the capacitive touch sensor 113 before sending the signal(s) to the controller 150. For example, the capacitive touch sensor 113 may be operable to detect moisture on the imaging surface 138 when the interactive assembly 110 is otherwise inactive, e.g., in a sleep mode or off. Upon activation, air handler 216 moves or motivates air across or about image monitor 112. Accordingly, grease and moisture, etc. rising upward along the vertical direction V (denoted by arrows 246 in FIGS. 5 and 6), e.g., from a boiling pot of water heated by a heating element 326 of cooktop appliance 300, are prevented from landing and/or accumulating on image monitor 112. Further, the air moved across or about image monitor 112 may cool components of image monitor 112 and may dehumidify the image monitor 112, e.g., by promoting evaporation of accumulated moisture on the imaging surface 138.

Figure 7:
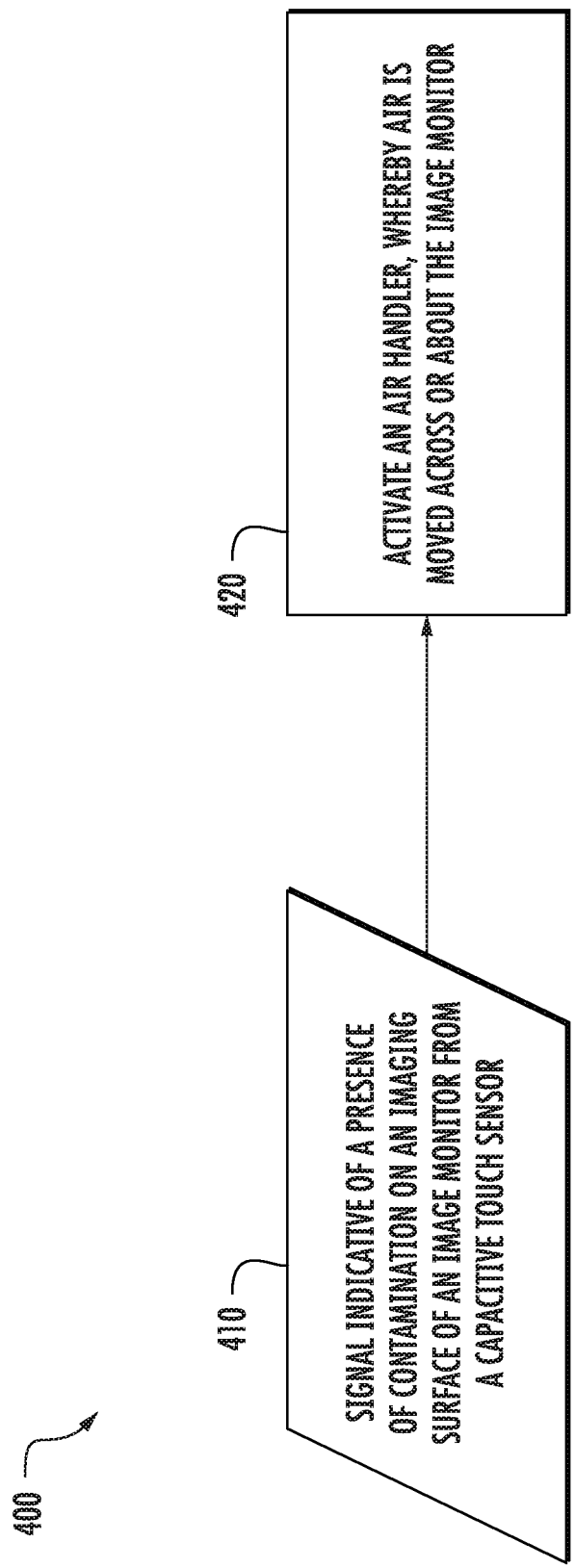
FIG. 7 provides a flow diagram of an exemplary method for operating a cooking system according to exemplary embodiments of the present disclosure.

FIG. 7 provides a flow diagram of an exemplary method 400 of operating a cooking system according to exemplary embodiments of the present disclosure. In some implementations, the cooking system includes an interactive assembly and a cooktop appliance defining a vertical direction. For instance, the cooking system may be the cooking system 100 depicted in FIGS. 1 through 6 and described above. Further, controller 150 of interactive assembly 110 of the system 100 may implement part or all of the method 400. To provide context to exemplary method 400, the reference numerals used in FIGS. 1 through 6 to describe the features of system 100 will be used below. It will be appreciated, however, that method 400 is not limited in scope to the system 100 of FIGS. 1 through 6; rather, method 400 is applicable to other suitable cooking systems.

As shown, method 400 includes, at 410, receiving one or more signals from a capacitive touch sensor, where the signal is indicative of the presence of contamination, e.g., moisture, smoke, grease, other vapors, cooking byproducts, and the like, on an imaging surface of an image monitor of the interactive assembly, the interactive assembly positioned above the cooktop appliance along the vertical direction. For instance, the capacitive touch sensor may be the capacitive touch sensor 113 of the cooking system 100. Further, controller 150 is configured to receive such signals. The signals may be generated by capacitive touch sensor 113. Capacitive touch sensor 113 may continuously sense the capacitance of the reference electrode(s), as described above, and may continuously generate signals. In some implementations, the capacitive touch sensor 113 may sense and generate signals at predetermined intervals, e.g., every ten (10) seconds. The one or more signals may be received from capacitive touch sensor 113 by controller 150 directly or indirectly.

At 420, method 400 includes activating an air handler disposed within a casing of the interactive assembly. For example, controller 150 may be configured to activate air handler 216 based on the received signal from the capacitive touch sensor so that air is moved across or about the image monitor 112 upon receiving the one or more signals from capacitive touch sensor 113, where the one or more signals is or are indicative of the presence of contamination on the imaging surface 138 positioned above the cooktop appliance 300. For instance, the air handler may be the air handler 216 of FIG. 5 or one or both of the air handlers 216A, 216B of FIG. 6. Accordingly, the air handler may be activated to move air across or about the imaging surface 138 to prevent condensation from forming thereon.

In some embodiments, the signal indicative of the presence of contamination on the imaging surface 138 may correspond to a measured mutual capacitance less than a touch threshold. For example, the measured mutual capacitance may be a capacitance between two electrodes, as noted above, and the presence of contamination, e.g., moisture, on the imaging surface 138 opposite the capacitive touch sensor 113 may reduce the mutual capacitance between the two electrodes of the capacitive touch sensor 113.

In some implementations, when the air handler is activated at 420, the air handler moves air across an imaging surface of the image monitor. For example, with reference specifically to FIG. 5, air may be moved or motivated by air handler 216 to flow through second air outlet 214 and along the cooling airflow path 250 defined along at least a portion of imaging surface 138 of image monitor 112.

In some further embodiments, the casing 116 may define an air inlet 210 and one or both of a first air outlet 212 defined above the image monitor 112 along the vertical direction and a second air outlet 214 defined below the image monitor 112 along the vertical direction V. In such embodiments, when the air handler 216 (or one or both of 216A and 216B) is activated, e.g., at step 420, the air handler moves or motivates air through the first air outlet 212 along a cooling airflow path defined along at least a portion of an imaging surface of the image monitor along the vertical direction and/or through the second air outlet and along an airflow curtain path defined substantially orthogonal to the vertical direction. For example, with reference to FIG. 5, air may be moved or motivated by air handler 216 from or through air inlet 210 and ultimately through second air outlet 214 and along the cooling airflow path 250 defined along at least a portion of imaging surface 138 of image monitor 112. Further, air may be moved or motivated by air handler 216 from or through air inlet 210 and ultimately through first air outlet 212 and along airflow curtain path 242 defined substantially orthogonal to the vertical direction V. As another example, one or both of the air handlers 216A and 216B shown in FIG. 6 may be provided to move or motivate air from the air inlet 210 to either or both of the first air outlet 212 and the second air outlet 214. In this way, image monitor 112 and components of interactive assembly 110 may be cooled and condensation may be prevented from forming thereon.

In some embodiments, the step 410 of receiving the signal and the step 420 of activating the air handler may only be performed when the interactive assembly is not in an active state, e.g., is in a low-power mode, which may be referred to as sleep mode, or is turned off. For example, when the interactive assembly is on and/or activated, the air handler 216 or air handlers 216A and 216B may be always on, e.g., to provide constant cooling to electronic components of the interactive assembly 110 while the interactive assembly 110 is in use. In such embodiments, the capacitive touch sensor 113 may be configured to operate only in self-capacitance mode when the interactive assembly 110 is active, e.g., to avoid or minimize false touches.

In some embodiments, the air handler 216 or air handlers 216A and 216B may be manually deactivated. In other embodiments, the controller 150 may further be configured for and/or exemplary methods may further include receiving a second signal from the capacitive touch sensor after activating the air handler, where the signal indicative of contamination on the imaging screen is a first signal. The second signal may be indicative of a reduction in the contamination on the imaging surface, e.g., the second signal may indicate or correspond to an increase in the measured mutual capacitance described above. Such embodiments may further include deactivating the air handler 216 (or one or both of 216A and 216B) after receiving the second signal.

Figure 8:
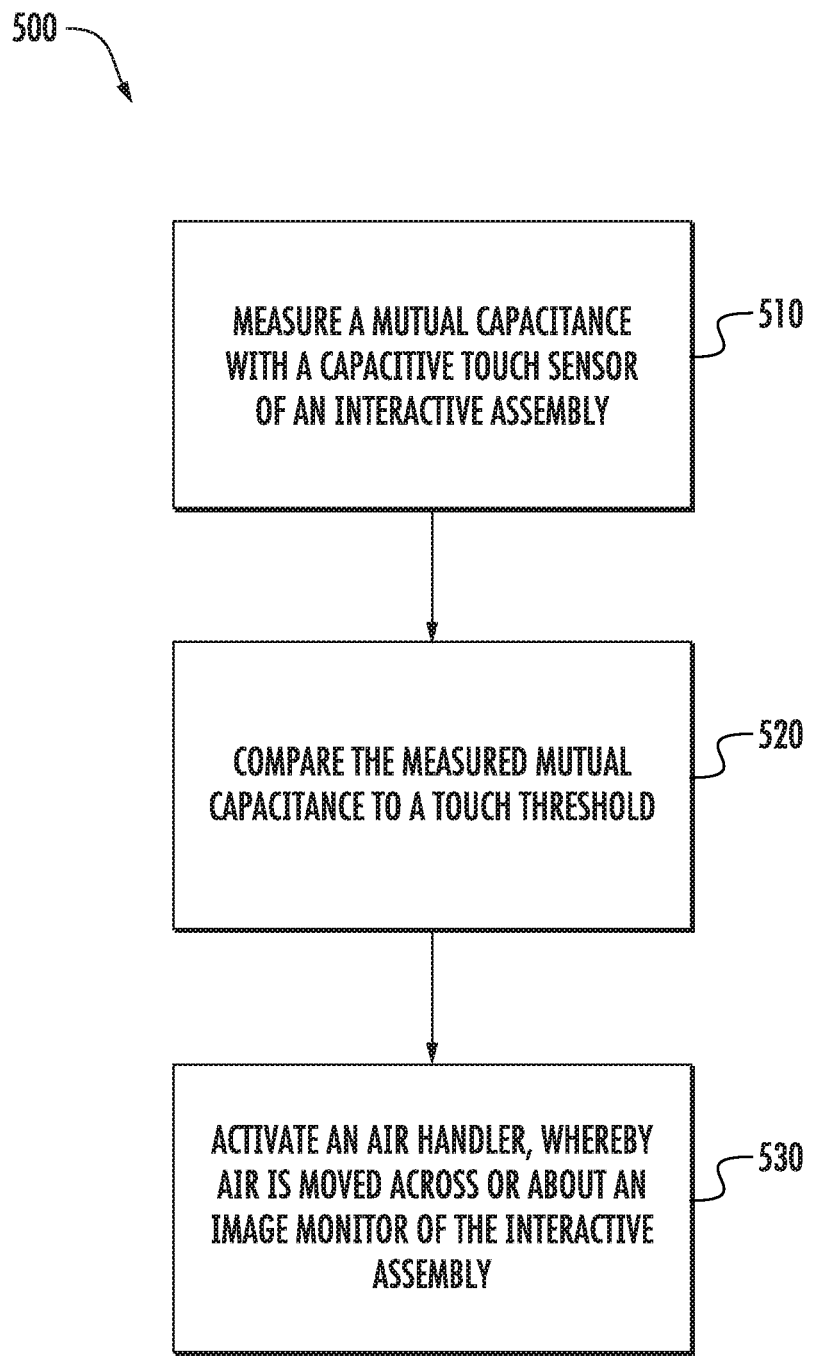
FIG. 8 provides a flow diagram of an exemplary method for operating a cooking system according to additional exemplary embodiments of the present disclosure.

FIG. 8 provides a flow diagram of another exemplary method 500 of operating a cooking system. The cooking system may include an interactive assembly and a cooktop appliance defining a vertical direction. As shown in FIG. 8, the method 500 may include a step 510 of measuring a mutual capacitance with a capacitive touch sensor 113 of the interactive assembly 110, and a step 520 of comparing the measured mutual capacitance to a touch threshold. When the measured mutual capacitance is less than the touch threshold, the method 500 may proceed to a step 530 of activating an air handler 216 (or one or both of 216A and 216B) disposed within a casing 116 of the interactive assembly 110, whereby air is moved across or about an image monitor 112 of the interactive assembly 110.

In some embodiments, the touch threshold may be a first touch threshold. For example, such embodiments may further include measuring a self-capacitance of the capacitive touch sensor 113 when the measured mutual capacitance is less than the first touch threshold. The measured self-capacitance may be compared to a second touch threshold. When the measured mutual capacitance is less than the first touch threshold and the measured self-capacitance is less than the second touch threshold, the method 500 may include activating the air handler 216 (or one or both of 216A and 216B). When the measured self-capacitance is greater than the second touch threshold, the method may include activating the image monitor 112. In some instances, the step 530 of activating the air handler when the measured mutual capacitance is less than the measured self-capacitance may only include activating the air handler of the interactive assembly 110. For example, the image monitor 112 may remain inactive (e.g., low power or off) while the air handler 216 or one or both of 216A and 216B is activated, e.g., when the measured mutual capacitance is less than the first touch threshold and the measured self-capacitance is less than the second touch threshold.

The measured self-capacitance may be used to determine whether a true touch has been detected, e.g., a user is attempting to activate the interactive assembly 110 via the imaging surface 138, or a false touch has been detected, e.g., when contamination is on the imaging surface 138. As mentioned above, when a grounded object, e.g., a user's finger or other body part, touches the imaging surface 138, an increase in self-capacitance may be detected or measured. The grounded object acts as a second plate of a simple parallel plate capacitor where an electrode of the capacitive touch sensor 113 is the first plate, such that the presence of the grounded object on the imaging surface 138 results in an increase in capacitance when measured as self-capacitance. In contrast, a non-grounded object, such as moisture or other contamination, on the imaging surface will result in a lesser, if any, increase in self-capacitance. Accordingly, the second touch threshold may be a sufficiently large value to distinguish a user's finger from contamination. For example, the second touch threshold may be a greater value, e.g., of capacitance or raw data counts, than a value associated with the self-capacitance corresponding to the presence of non-grounded objects such as contamination on the imaging surface 138.

The interactive assembly 110 may therefore be programmed or configured such that, when inactive, the capacitive touch sensor 113 may detect an object touching the imaging surface 138 based on a measured mutual capacitance between two electrodes. As noted above, the measured capacitance may be continuously or repeatedly measured, whereby the capacitive touch sensor 113 may be configured to detect and respond to changes in the measured capacitance over time. When the measured mutual capacitance drops, e.g., below the first touch threshold, the air handler(s) may be activated. Further, after activating the air handler(s), the capacitive touch sensor 113 may then measure a self-capacitance and additional components of the interactive assembly 110, e.g., the image monitor 112, may be activated based on the measured self-capacitance, e.g., based on whether the measured self-capacitance exceeds a second touch threshold which indicates a user may be touching the imaging surface 138.

As noted above, in various embodiments, the air handler(s) may be deactivated manually or automatically. As another example, in some embodiments, the air handler(s) may be automatically deactivated by iterating the steps 510 and 520 of measuring the mutual capacitance with the capacitive touch sensor of the interactive assembly and comparing the measured mutual capacitance to the touch threshold after activating the air handler, and the method 500 may further include deactivating the air handler when a subsequent measured mutual capacitance is greater than the touch threshold.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a cooking system, the cooking system comprising an interactive assembly and a cooktop appliance defining a vertical direction, the method comprising:
   receiving a signal from a capacitive touch sensor of the interactive assembly, the signal indicative of a presence of contamination on an imaging surface of an image monitor of the interactive assembly, the interactive assembly positioned above the cooktop appliance along the vertical direction; and
   activating an air handler disposed within a casing of the interactive assembly based on the signal received from the capacitive touch sensor, the casing defining an air inlet, a first air outlet defined above the image monitor along the vertical direction, and a second air outlet defined below the image monitor along the vertical direction, whereby air is moved through the first air outlet along a cooling airflow path defined along at least a portion of the imaging surface of the image monitor along the vertical direction and through the second air outlet and along an airflow curtain path defined generally orthogonal to the vertical direction.

2. The method of claim 1, wherein the signal indicative of the presence of contamination on the imaging surface corresponds to a measured mutual capacitance less than a touch threshold.

3. The method of claim 1, wherein the step of receiving the signal and the step of activating the air handler are only performed when the interactive assembly is in an inactive state.

4. The method of claim 1, wherein the signal indicative of the presence of contamination is a first signal, further comprising receiving a second signal from the capacitive touch sensor after activating the air handler, the second signal indicative of a reduction in the contamination on the imaging surface, and deactivating the air handler after receiving the second signal.

5. A cooking system defining a vertical direction, a lateral direction, and a transverse direction, the cooking system comprising:
   a cooktop appliance comprising a cooktop surface and one or more heating elements positioned at the cooktop surface;
   a casing positioned above the cooktop appliance along the vertical direction, the casing defining an air inlet, a first air outlet, and a second air outlet;
   an image monitor supported by the casing, the image monitor comprising an imaging surface and a capacitive touch sensor configured to detect a touch on the imaging surface, the first air outlet defined above the image monitor along the vertical direction, and the second air outlet defined below the image monitor along the vertical direction;
   an air handler mounted within the casing; and
   a controller communicatively coupled with the air handler and the capacitive touch sensor, the controller configured to:
      receive a signal from the capacitive touch sensor, the signal indicative of a presence of contamination on the imaging surface; and
      activate the air handler based on the signal received from the capacitive touch sensor, whereby air is moved through the first air outlet along a cooling airflow path defined along at least a portion of an imaging surface of the image monitor along the vertical direction and through the second air outlet and along an airflow curtain path defined generally orthogonal to the vertical direction.

6. The cooking system of claim 5, wherein the signal indicative of the presence of contamination on the imaging surface corresponds to a measured mutual capacitance less than a touch threshold.

\* \* \* \* \*